United States Patent [19]

Steer

[11] Patent Number: 5,110,413
[45] Date of Patent: May 5, 1992

[54] INTUMESCENT SHEET MATERIAL

[75] Inventor: Adrian M. Steer, Halifax, United Kingdom

[73] Assignee: T & N Technology Limited, Warwickshire, England

[21] Appl. No.: 562,844

[22] Filed: Aug. 6, 1990

[51] Int. Cl.$^5$ ............................................. D21H 17/67
[52] U.S. Cl. .................................. 162/145; 162/181.6; 162/181.8; 162/181.9
[58] Field of Search ...................... 162/145, 152, 181.6, 162/159, 181.8, 181.9, 169; 428/920, 921, 913

[56] References Cited

U.S. PATENT DOCUMENTS

| | | | |
|---|---|---|---|
| 3,574,644 | 4/1971 | Olstowski | 106/15 |
| 3,916,057 | 10/1975 | Hatch et al. | 162/181.6 |
| 4,378,271 | 3/1983 | Hargreaves et al. | 162/181.6 |
| 4,454,190 | 6/1984 | Katagiri | 162/181.9 |

FOREIGN PATENT DOCUMENTS 0006362 6/1979 European Pat. Off. .

Primary Examiner—Peter Chin
Attorney, Agent, or Firm—Nixon & Vanderhye

[57] ABSTRACT

Intumescent sheet material having a matrix whose predominant ingredient is an unfired kaolinitic clay comprising ball clay reinforced by inorganic vitreous fibre (for example, mineral wool) contains heat-expandable graphite as intumescent agent and up to 10 percent by weight of an organic binder. It is made by dewatering an aqueous suspension of the aforesaid ingredients in the form of a layer which includes cellulose fibre as web-forming agent.

9 Claims, No Drawings

INTUMESCENT SHEET MATERIAL

This invention relates to intumescent sheet material such as is suitable for attachment to doors or the like to provide that, if fire breaks out, the sheet will swell to seal the gap between door and frame or other adjacent element of structure, and so prevent the passage of flame and hot gases.

There is described in EP-A-0,006,362, published 1980, sheet material having a matrix whose predominant ingredient is unfired ball clay reinforced by inorganic vitreous fibre such as mineral wool, glass wool or ceramic fibre. The material includes an organic binder and is made by dewatering an aqueous suspension of the aforesaid ingredients in the form of a layer which includes cellulose fibre (up to about 7 per cent by weight of solids present) as web-forming agent, to facilitate drainage of water through the filter element or felt employed in the dewatering step. The sheet material that results from drying the dewatered layer is a useful alternative to previous products which included asbestos as an essential ingredient, and has good wet and dry strength and adequate heat insulation properties. The material is in general non-combustible in layman's terms, and can be made incombustible according to the appropriate British Standard by keeping the total content of organic substance (in particular, organic binder and cellulosic web-former) below about 10 per cent by weight.

By the present invention, the products of EP-A-0,006,362, and sheet products that are similar in having a vitreous-fibre-reinforced matrix of unfired kaolinitic clay comprising ball clay, serve as a basis for intumescent sheet material, which is produced by including heat-expandable graphite in the aqueous suspension subjected to dewatering.

Heat-expandable (or "heat-exfoliable") graphite is a form of graphite which, by virtue of the presence within its crystal lattice of intercalated species (for example, $HSO_4^-$, $NO_3^-$, $H_2O$) is decomposable by heat with extensive expansion in a direction (the c-direction) perpendicular to the faces of the hexagonally arranged carbon atoms constituting the lattice, so that a swollen graphite ("exfoliated graphite") of very low bulk density is obtained. One suitable method of preparation is described in the introduction to the Examples in British Patent 2,128,629, and another in U.S. Pat. No. 4,350,576.

The heat-expandable graphite suitably forms at least 10 per cent by weight of the sheet material (and therefore 10 per cent by weight of the solids of the suspension that is dewatered), and preferably at least 15 per cent by weight thereof.

The sheet material may contain mica as reinforcing filler, in an amount that preferably does not exceed about 10 per cent by weight.

To control the rate of drainage of water from the layer of aqueous suspension undergoing dewatering during manufacture, the suspension may contain bentonite clay (a montmorillonite clay), suitable in an amount up to about 5 per cent by weight of suspended solids.

If sheet material cheaper than that resulting from use of ball clay alone as the clay matrix component is required, then kaolin clay in an amount up to two-thirds by weight of the total kaolinitic clay may be employed in admixture with the ball clay. (Ball clay and kaolin clay both have a basis of the mineral kaolinite, but kaolin clay is much less plastic. It is often called china clay).

The organic binder, which may form up to 10 per cent by weight of the sheet material, is preferably a starch, conveniently farina starch, to facilitate moulding of the product (after rewetting) by the user to a desired shape e.g. cylindrical or part-cylindrical. If an elastomer (e.g. styrene-butadiene) is employed as binder, it makes a useful contribution to the toughness of the product.

The total content of organic material (in particular, binder + web-former) is desirably no greater than 15 per cent by weight.

In preparing the sheet material, dewatering may be carried out in a filter press, to obtain a monolithic product. Preferably, however, dewatering is performed using standard board-making machinery, i.e. on a Fourdrinier or like screen or felt, followed by winding onto the drum of the machine so that a laminar product is obtained.

The invention is further illustrated by the following Examples.

EXAMPLE 1

An aqueous suspension was prepared from the following ingredients.

|  | Weight % |
| --- | --- |
| Mineral wool (fiber length, 2.8 mm) | 24.1 |
| Lapponia wood pulp | 4.7 |
| Ball clay (HYMOD AT) | 40.1 |
| Mica flake | 2.4 |
| Polyacrylamide flocculating agent (PERCOL E24) | 0.05 |
| Bentonite | 1.8 |
| Farina starch | 3.9 |
| Heat-expandable graphite | 23.0 |
|  | 100.05 |

The heat-expandable graphite employed was a commercially available product prepared electrolytically from natural crystalline flake graphite of 85 per cent carbon content, 15 per cent ash. Its bulk density was 560 $kg/m^3$.

The suspension, diluted with water to 3 per cent solids content, was pumped to a standard board making machine such as is described on page 291, Chapter 12, of "Paper and Board Manufacture" by Julius Grant, James H. Young and Barry G. Watson (Publishers: Technical Division, the British Paper and Board Industry Federation, London, 1978). The slurry was distributed over the width of the water-permeable conveyor felt of the machine and was progressively dewatered as it travelled on the felt. From the felt, the dewatered layer was passed to the drum (or "making roll") of the machine, on which it was wound until a thickness of at least 1.5 mm had been built up. The hollow laminar cylinder formed on the drum was then slit axially, and the sheet thus released was laid flat and dried to moisture content of about 2 per cent by weight.

The properties of a typical product were:

| Thickness | 2.5 mm |
| --- | --- |
| Density | 0.897 $gm/cm^3$ |
| Tensile strength | 4.4 MPa |
| Flexural strength | 6.8 MPa |
| Compression at 21 MPa | 41.3% |
| Recover | 19.9% |

| -continued | |
|---|---|
| Work of flexure | 17.7 Nmm |

In tests to examine behaviour in a fire, the product had an activation temperature of 200° C. at a loading of 0.35 MPa, and maximum expansion of 117 per cent. The maximum pressure generated (11.3 bar) was at 410° C.

EXAMPLE 2

Following generally the procedure of Example 1, sheet was prepared from an aqueous suspension of the following ingredients.

| | Weight % |
|---|---|
| Mineral wool | 23.8 |
| Lapponia wood pulp | 4.5 |
| Ball clay | 37.6 |
| Mica flake | 2.2 |
| Polyacrylamide flocculant | 0.05 |
| Bentonite | 1.7 |
| Farina starch | 3.6 |
| Heat-expandable graphite | 21.6 |
| Non-carboxylated butadiene-styrene copolymer latex (pH 10.5; 44% solids), dry weight | 5.0 |
| | 100.05 |

Alum was employed to bring about deposition of the latex solids.

The properties of a typical product were:

| | | |
|---|---|---|
| Thickness | 2 | mm |
| Denisty | 0.996 | gm/cm³ |
| Tensile strength | 8.1 | MPa |
| Flexural strength | 12.2 | MPa |
| Compression at 21 MPa | 40.7% | |
| Recovery | 21.4% | |

| -continued | |
|---|---|
| Work of flexure | 45.1 Nmm |

In fire tests, the product had an activation temperature of 155° C. at a loading of 0.35 MPa, and maximum expansion of 82 per cent. The maximum pressure generated (8.8 bar) was at 460° C.

I claim:

1. A method of making intumescent sheet material having a matrix whose predominant ingredient is an unfired kaolinitic clay comprising ball clay reinforced by inorganic vitreous fibre, said material including up to 10 per cent by weight of an organic binder, by dewatering an aqueous suspension of the aforesaid ingredients in the form of a layer which includes cellulose fibre as web-forming agent, said suspension containing an amount of heat-expandable graphite sufficient to swell the sheet in a fire.

2. A method according to claim 1, in which the heat-expandable graphite forms at least 15 per cent by weight of the sheet.

3. A method according to claim 1, in which the inorganic vitreous fibre is mineral wool.

4. A method according to claim 1, in which the suspension contains mica in an amount up to 10 per cent by weight of the sheet.

5. A method according to claim 1, in which the suspension contains bentonite clay in an amount up to 5 per cent by weight of the sheet.

6. A method according to claim 1, in which the suspension contains china clay in an amount up to two-thirds by weight of the total kaolinitic clay.

7. A method according to claim 1, in which the organic binder comprises starch.

8. A method according to claim 1, in which the organic binder comprises an elastomer.

9. A method according to claim 1, in which the total content of organic material in the suspension is no greater than 15 per cent by weight of the sheet.

* * * * *